United States Patent

[11] 3,624,724

[72] Inventor  Barnard C. Sheffer
             Binghamton, N.Y.
[21] Appl. No. 10,948
[22] Filed    Feb. 12, 1970
[45] Patented Nov. 30, 1971
[73] Assignee GAF corporation
             New York, N.Y.

[54] MEDICAL X-RAY SENSITOMETER
     6 Claims, 7 Drawing Figs.
[52] U.S. Cl............................................. 95/1 R,
                        250/65, 355/23, 355/26, 355/46
[51] Int. Cl....................................... G03b 27/70
[50] Field of Search............................ 355/26, 46,
                                              23; 95/1; 250/65

[56]              References Cited
              UNITED STATES PATENTS
3,479,118  11/1969  Paige............................. 355/26

Primary Examiner—Samuel S. Matthews
Assistant Examiner—Richard A. Wintercorn
Attorneys—George L. Tone, Walter G. Hensel and Martin Smolowitz ABSTRACT: A rectangular housing is provided with a rear wall opening from which a bellowslike light tunnel extends to the front of a box containing a light source. The light-source box is carried by a platform extending rearwardly from the bottom of the housing and under the bellows, for manual adjustment toward and away from the housing. Upper and lower mirrors are mounted in the housing for rotation about parallel axes arranged so that the mirrors reflect light from such source as they are rotated at a selected speed through a single cycle of 360°. The housing is also provided with a drawer assembly carrying a bottom tablet holder which can be manually pulled out with the drawer for insertion of a film strip to be exposed; and when pushed back automatically locks such tablet holder in position with a top tablet holder, with the film strip to be exposed held firmly between multistep sensitometer tablets mounted in the holders. The film strip is thus held for exposure between the mirrors in a central horizontal plane, with the upper surface of the film facing the upper mirror and the lower surface of the film facing the lower mirror. Suitable light aperture plates are disposed in the housing between the mirrors and light source, and the mirrors are rotated in angular synchronism with each other, and with a shutter in the front of the light box, whereby both sides of two 35 mm. wide × 10 in. long sensitometric film strips, or a single film strip 70 mm × 10 in. long, can be automatically exposed from such single light source, for a selected time interval, at the end of which the top tablet holder retracts, releasing the drawer assembly for removal of the exposed film, and reloading thereof with the next film strip or strips to be exposed.

INVENTOR.
Bernard C. Sheffer

INVENTOR.
Bernard C. Sheffer

MEDICAL X-RAY SENSITOMETER

This invention relates to sensitometers, and more particularly a medical X-ray sensitometer for exposing both sides of two sensitometric film strips to light from a common source.

The main object of the invention is to provide a high-quality medical X-ray sensitometer that is compact; semiautomatic in operation, easy and convenient to load and unload; precise and accurate to adjust and in operation, with minimal supervision; and which will accept either two, 35 mm. wide × 10 in. long sensitometric film strips; or a single film strip, 70 mm. wide × 10 in. long, for example, and simultaneously expose both sides thereof from a single (common) light source.

Other important objects will appear from the following disclosure of the invention.

The invention embodies two (top and bottom) 21-step sensitometer tablets mounted in holders. The bottom one is fixed; while the top one automatically retracts upon completion of exposure, and closes upon insertion of unexposed film. A sliding drawer or tray assembly allows the bottom tablet holder to be pulled out for easy loading of film strips by the operator.

The drawer automatically locks when pushed back, in exposure position, thereby, insuring exact registration of the tablets prior to and during, exposure. The top tablet holder moves up or down by virtue of an eccentric cam and link mechanism. This mechanism also serves as a pressure platen that holds the film securely between the tablets during exposure.

A single light source is mounted on an adjustable platform and provides the necessary light for exposure. The total lightray length traced from light source to film plane equals 1 meter, for example.

Simultaneous exposure, on both sides, at the film plane, is accomplished by light rays eminating from the single light source and reflecting from twin rotating mirrors mounted on centers located equidistant from the film plane. A shutter at the light source is controlled by adjustable cams mounted on the rotating mirror shaft. One cam causes the shutter to open relative to a mirror position and the other adjusted to close the shutter at a mirror position.

The mirrors rotate through a 360° cycle and stop until another exposure is programmed. This control of on-off light, relative to angular position, plus the correct apertures placed in the optical path provide the correct time exposure. Seven sets of aperture plates (two per set) are used to provide a range of exposure time from 1 to 0.01 sec. Time exposures longer than 1 sec. are made by rotating the mirrors to a preselected angular position and then engaging a detent pin. Exposure time is regulated in this mode by preset automatic timers.

A constant speed electric motor coupled to an electromechanical two-stop single revolution clutch provides the intermittent actuation force to drive the top tablet holder (platen) up or down.

Mirror rotation is accomplished by a constant speed electric motor driving a jackshaft on which two electromechanical clutches are mounted. Each clutch hub has a mounted gear that meshes with a gear on the output shaft. The jackshaft will idle but will not transmit power to the output shaft till either one of the clutches has been energized. The gear box output shaft is capable of two speeds, either of which can be preselected electrically.

Both mirrors are driven together by sprocket and silent chain an adjustment provided to synchronize the angular position of the mirrors.

Figure 1:
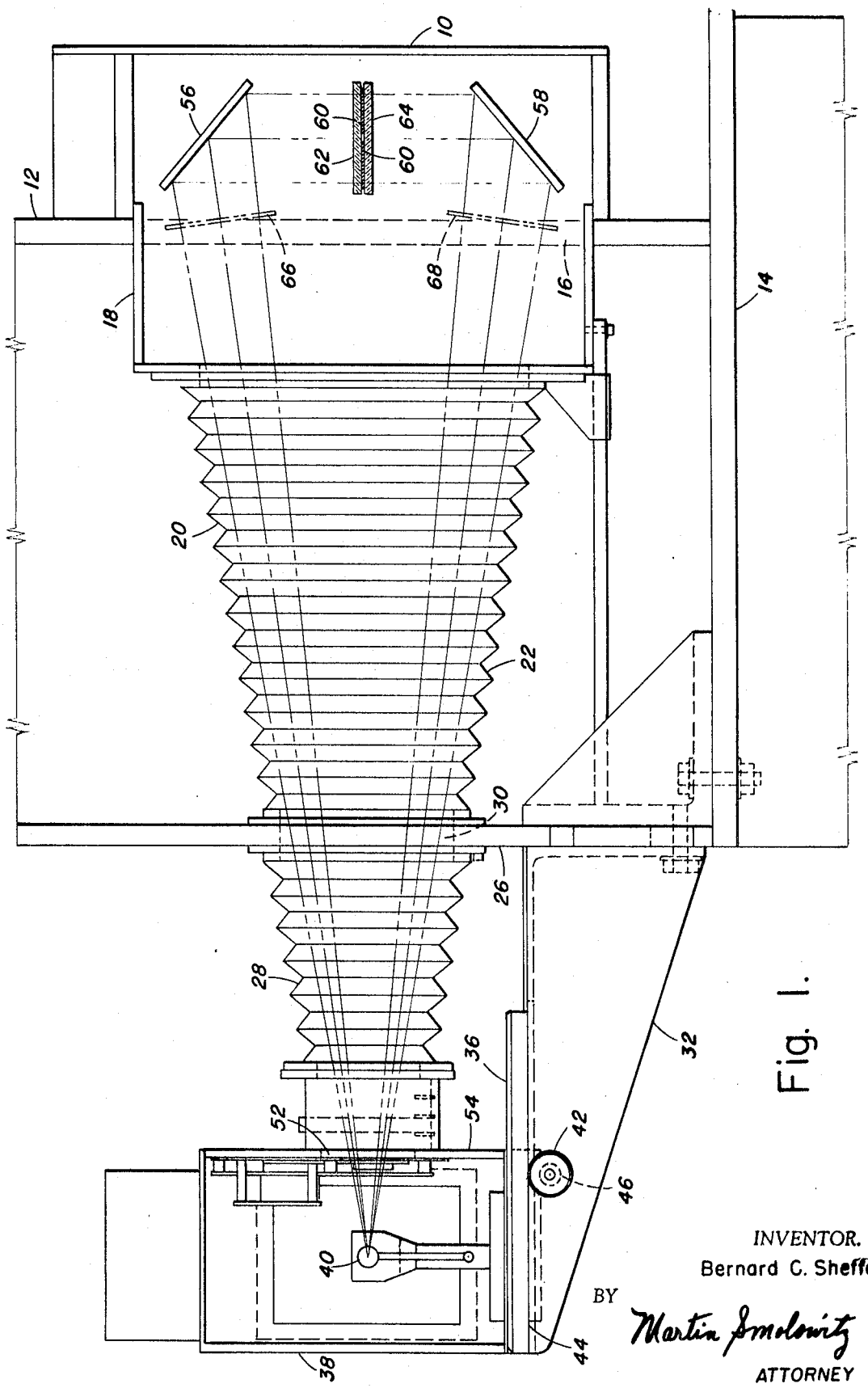
FIG. 1 is a fragmentary side elevational view, with parts broken away and shown in section, of a sensitometer illustrative of the invention.

As shown in FIG. 1, a lightproof housing 10 having a rear wall member 12 is mounted on a horizontal plate 14. The wall member 12 is provided with a large rectangular opening 16 in which end frame 18 of a bellows-type light tunnel 20 fits. The bellows consist of a large section 20 that is supported at one end by a vertical plate 26, and a small section 28 that is also supported at one end by said plate 26. The latter is provided with an opening 30 for the light tunnel, and is mounted adjacent the rear edge of the plate 14 by means including a rearwardly extending bracket 32 which is located under the bellows section 28.

Mounted for sliding adjustment on the top of bracket 32 is the horizontal base 36 of a box 38 containing a light source 40. The position of box 38 is manually adjusted by means of a finger knob 42 having a rack 44 and gear 46 connection with the underside of the base for moving the box toward or away from the housing 10 when the knob is turned in one direction or the other, to precisely set the optical distance of the light source 40 from the housing.

Figure 2:
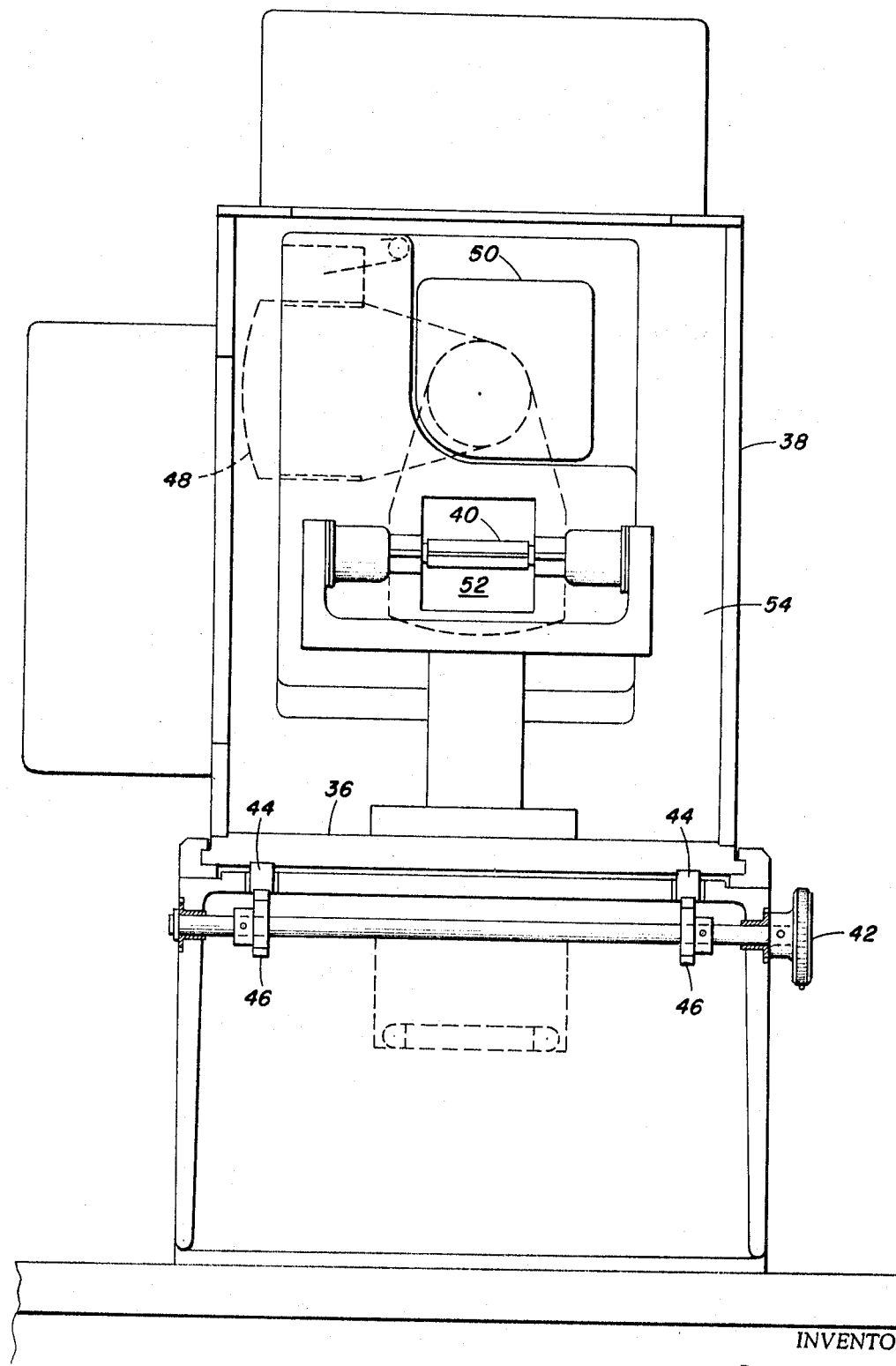
FIG. 2 is a fragmentary view in rear elevation of the sensitometer, with parts broken away and as shown in cross section.

The box 38, FIG. 2, contains a leaf shutter 48 which is operated by a drive mechanism 50 to open and close a light aperture 52 in the front wall 54 of the box 38, in synchronism with rotating mirrors 56 and 58, FIG. 1, in the housing 10 as the latter are in position to reflect light from the source 40 toward the upper and lower surfaces of sensitometric film strip 60,60 located midway between the mirrors in horizontal 21-step sensitometer tablets 62 and 64.

Removable aperture plates 66 and 68 are fixed in the housing 10 in the path of light from the source 40 when the shutter 48 is open, so that when the mirrors 56 and 58 are in correct angular position to reflect the light toward the film 60, they do so at that time. Thus, the opposite sides of the film are exposed to light from the common source 40, as the mirrors rotate and the shutter opens the light aperture 52.

Figure 3:
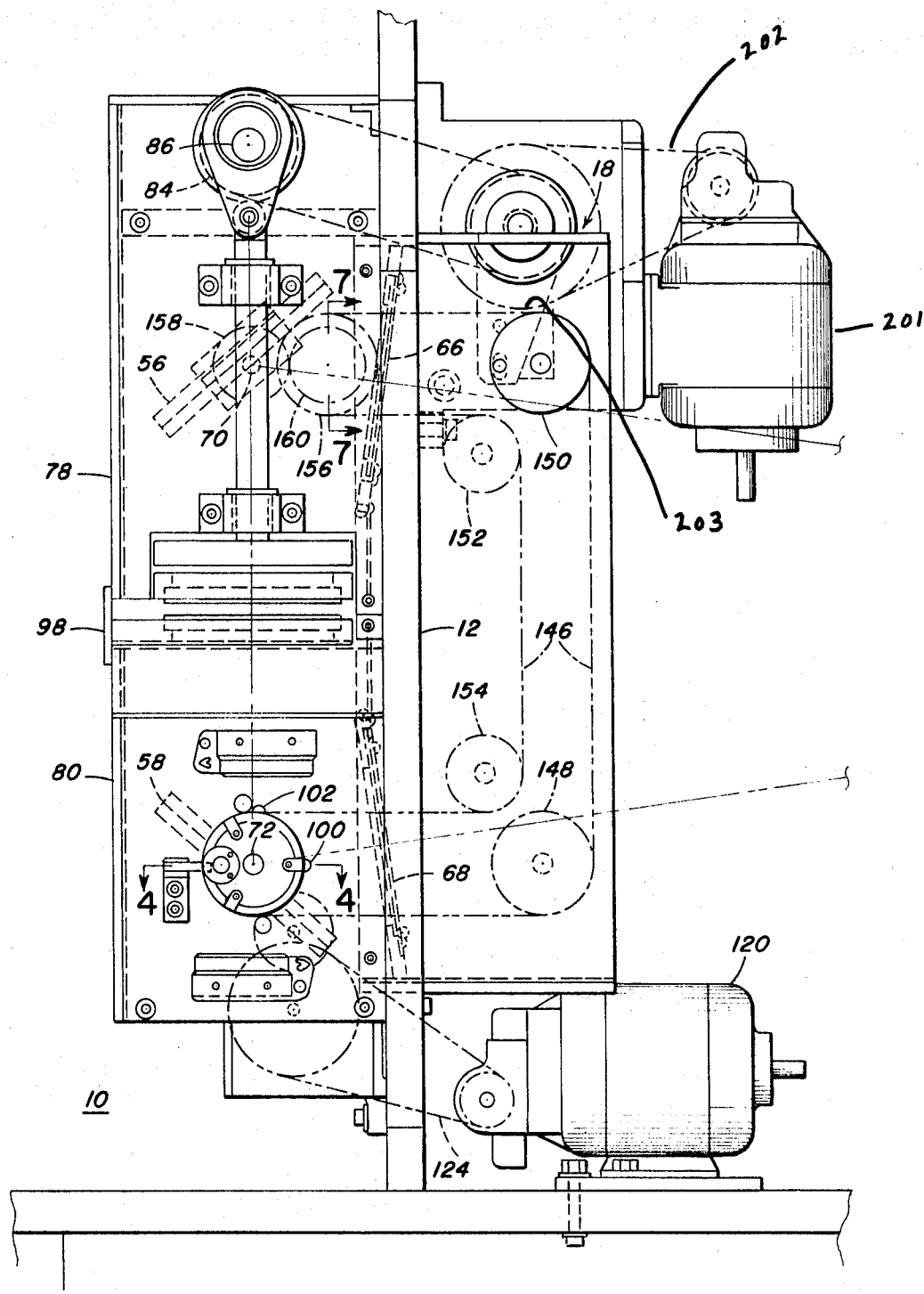
FIG. 3 is a fragmentary vertical cross-sectional view with parts shown in elevation of the rotating mirror assembly.

Referring now to FIG. 3, the mirrors 56 and 58 are carried by parallel horizontal shafts 70 and 72, respectively, that are mounted to rotate in upper sidewalls 74 and 75, and lower sidewalls 76 and 77 of upper and lower sections 78 and 80 respectively, of the housing 10. The lower section 80 is fixed, being mounted on the vertical wall 12 of the housing 10. The upper section 78, however, is mounted for automatic limited vertical movement on the wall 12, up and down with respect to the lower section. Such movement takes place when eccentrics 84,84, FIG. 5, are operated by a transverse drive shaft 86 to raise section 78 through vertical connecting rods 88,88 upon completion of each exposure cycle, and to lower such section automatically when the machine is loaded with film to be exposed.

The lower section 80 is provided with a horizontal holder 90 for a tablet 92, and an upper section 78 is provided with a horizontal holder 94 for a tablet 96. A sliding drawer or tray assembly 98 allows the bottom tablet holder 90 to be pulled out of the housing 10 for easy loading of film strips. The drawer 98 automatically locks when pushed back to film exposure position with the tablets 92 in exact registration with the tablet 94. Thus, this mechanism also serves as a pressure platen, holding the films firmly in place during exposure.

Figure 4:
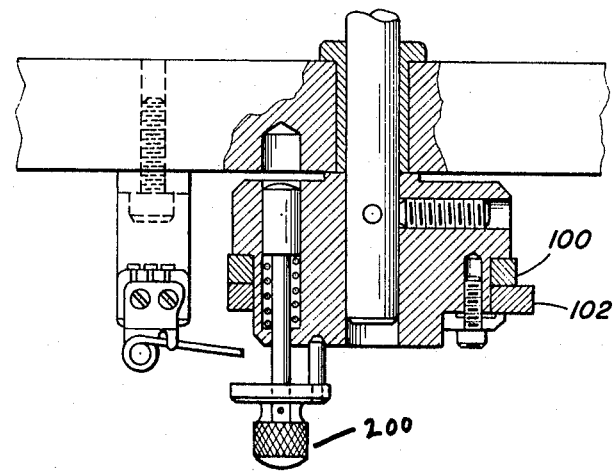
FIG. 4 is a detail mainly in section taken on line 4—4 of FIG. 3.
Figure 5:
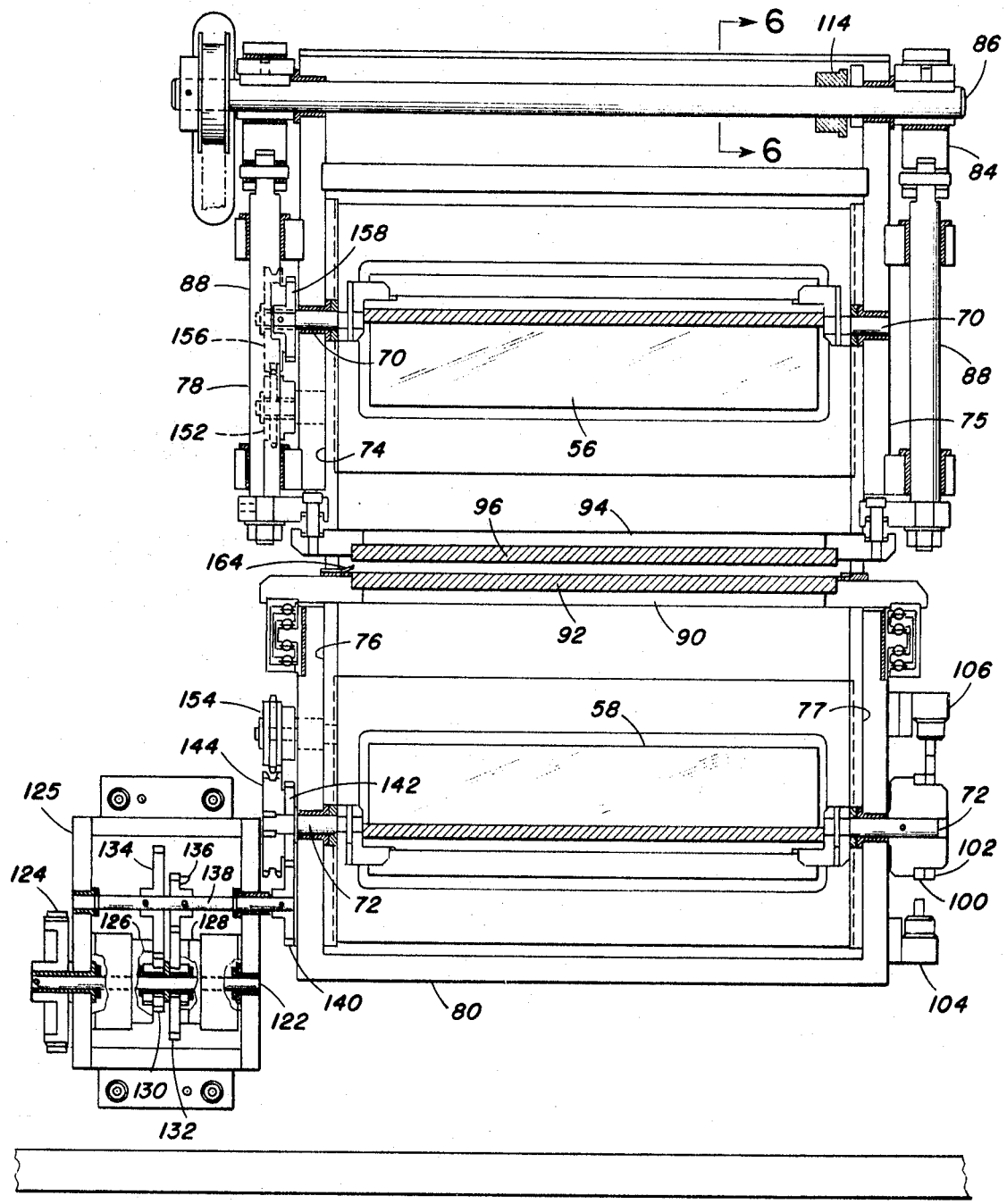
FIG. 5 is a view mainly in elevation and partly in section of such assembly.

The shutter drive mechanism 50 at the light source 40, FIG. 2, is controlled by an electric circuit (not shown), operated by cams 100, 102, FIGS. 4 and 5, connected to mirror shaft 72 outside of the housing 10, which throw microswitches 104 and 106. The cams are set so that one opens the shutter 48, and the other closes the shutter, while the mirrors are in effective angular position to reflect light from source 40 toward the film held between the mirrors.

Figure 6:
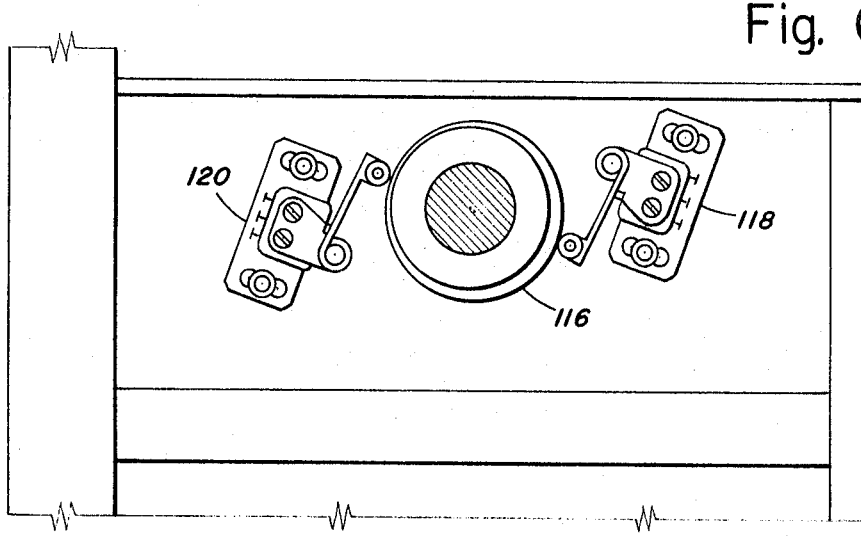
FIG. 6 is a detail mainly in section taken on line 6—6 of FIG. 5.

A constant speed drive motor 201 is connected by a belt 202 to an electromechanical two-stop clutch mechanism 203 providing means for driving the top tablet holder section 78 up, as well as down, by turning shaft 86 through drive pulley 114. The shaft is provided with a cam 116, FIG. 6, which operates microswitches 118 and 120 in the control circuit (not shown) to turn off the shaft drive means at the end of each half revolution thereof to raise or lower, the section 74 and it then automatically stops the upper platen holder 94 in its raised, or lowered position.

Figure 7:
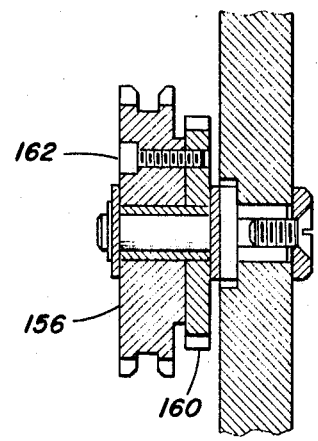
FIG. 7 is a fragmentary view mainly in section of a detail taken on line 7—7 of FIG. 3.

The mirrors 56 and 58 are rotated by a constant speed electric motor 120 which is connected by a belt 124 to the jackshaft 122 of a clutch box 125 containing two electromechanical clutches 126 and 128. Each clutch has a gear 130, 132 that meshes with a gear 134, 136 on an output shaft 138 jackshaft 122 idles until one or the other clutch is energized, whereupon the output shaft 138 is driven at the selected speed which is desired by means of a suitable control circuit (not shown) for energizing the clutch corresponding to such selected speed. The output shaft 138 drives the mirrors in unison through a silent gear 140 on the shaft 138, meshing with a silent gear 142 on a pulley 144 that is keyed to shaft 72 of lower mirror 58, and a silent chain belt 146 which is carried by pulley 144, idler pulleys 148, 150, 152 and 154, and pulley 156 which is geared to a silent gear 158 on the shaft 70 of upper mirror 58. The pulley 156 and adjacent gear 160 are connected by a pin 162, FIG. 7, that is removable for adjusting the mirrors into correct angular position with respect to each other and the light system.

The mirrors rotate through a 360° cycle and automatically stop until another exposure is started simply by loading and inserting the drawer 98 in the housing, thereby closing a switch 164 in the control circuit (not shown).

Several sets, seven for example, of aperture plates 66 and 68 are provided for a range of exposure time from 1.00 to 0.01 sec. Time exposures longer than 1.00 sec. are made by rotating the mirrors to a preselected angular position, and then engaging a detent pin 200. Exposure time in this mode is regulated by present automatic timers.

In normally operating the device, it is only necessary to load the drawer 98 with film to be exposed, and then insert the drawer in the housing 10. After exposure, the drawer is simply removed and the film replaced with a new strip or strips of film to be exposed.

What is claimed is:

1. A medical X-ray sensitometer for exposing both sides of sensitometric film strips simultaneously from a single light source, comprising:
    a housing having a light opening;
    multistep sensitometer tablets in said housing for firmly holding therebetween film strips for exposure to such light source;
    a bracket connected to said housing adjacent such opening;
    a box containing a single light source mounted on said bracket in spaced relation to such light opening;
    twin mirrors mounted in said housing for rotation about parallel axes located equidistant from the plane of the film on opposite sides thereof;
    fixed aperture plates removably located in the housing in light paths from said single light source to the mirrors;
    a leaf shutter mechanism carried by said box between such light source and said aperture plates;
    cam means comprising one cam aperture to open said shutter relative to the mirror position and another cam aperture to close the shutter at such mirror position, and
    means for simultaneously rotating said mirrors through a single 360° cycle for reflecting light from said source onto opposite sides of such film strip in synchronism when the shutter is open.

2. The invention as defined by claim 1, including:
    a longitudinally adjustable bellows-type light tunnel of rectangular cross section connected between said light-source box and said housing to cover such opening;
    a light-box-supporting platform slidably mounted on said bracket for accurately adjusting the light source toward and away from said housing; and
    manually operable means for precisely setting the position of said platform on said bracket, to fix the optical distance between such single light source and the film exposed to light therefrom via said mirrors.

3. The invention as defined by claim 1, including:
    means comprising a folder supporting one of said tablets in said housing;
    means acting to automatically retract the other tablet upon completion of each film exposure cycle, and close upon insertion of unexposed film strip; and
    a sliding drawer assembly whereby said tablet holder can be pulled out of the housing for easy loading of film strip to be exposed.

4. The invention as defined by claim 3, including:
    means for automatically locking the drawer when the latter is pushed back to film exposure position, thereby insuring exact registration of the tablets immediately prior to and during film exposure.

5. The invention as defined by claim 4, wherein said automatic drawer locking means comprises
    an eccentric cam and link mechanism which also serves as a pressure platen that holds film strip securely between the tablets during exposure.

6. The invention as defined by claim 1, wherein said means for rotating said mirrors comprises:
    a constant speed electric drive motor;
    a jackshaft driven by said motor;
    two electromechanical clutches mounted on said jackshaft; each of said clutches including a hub having a gear which meshes with a gear on an output shaft, whereby
    the jackshaft operates to idle but not transmit power to the output shaft until one of the clutches is energized, and
    the output shaft is capable of two different speeds, either one of which electrically can be preselected; and
    sprocket and silent chain drive means connecting said jackshaft and mirrors for simultaneously rotating said mirrors, comprising
    means for adjusting the relative angular position of the mirrors with respect to each other to synchronize their angular positions in operation.

* * * * *